UNITED STATES PATENT OFFICE.

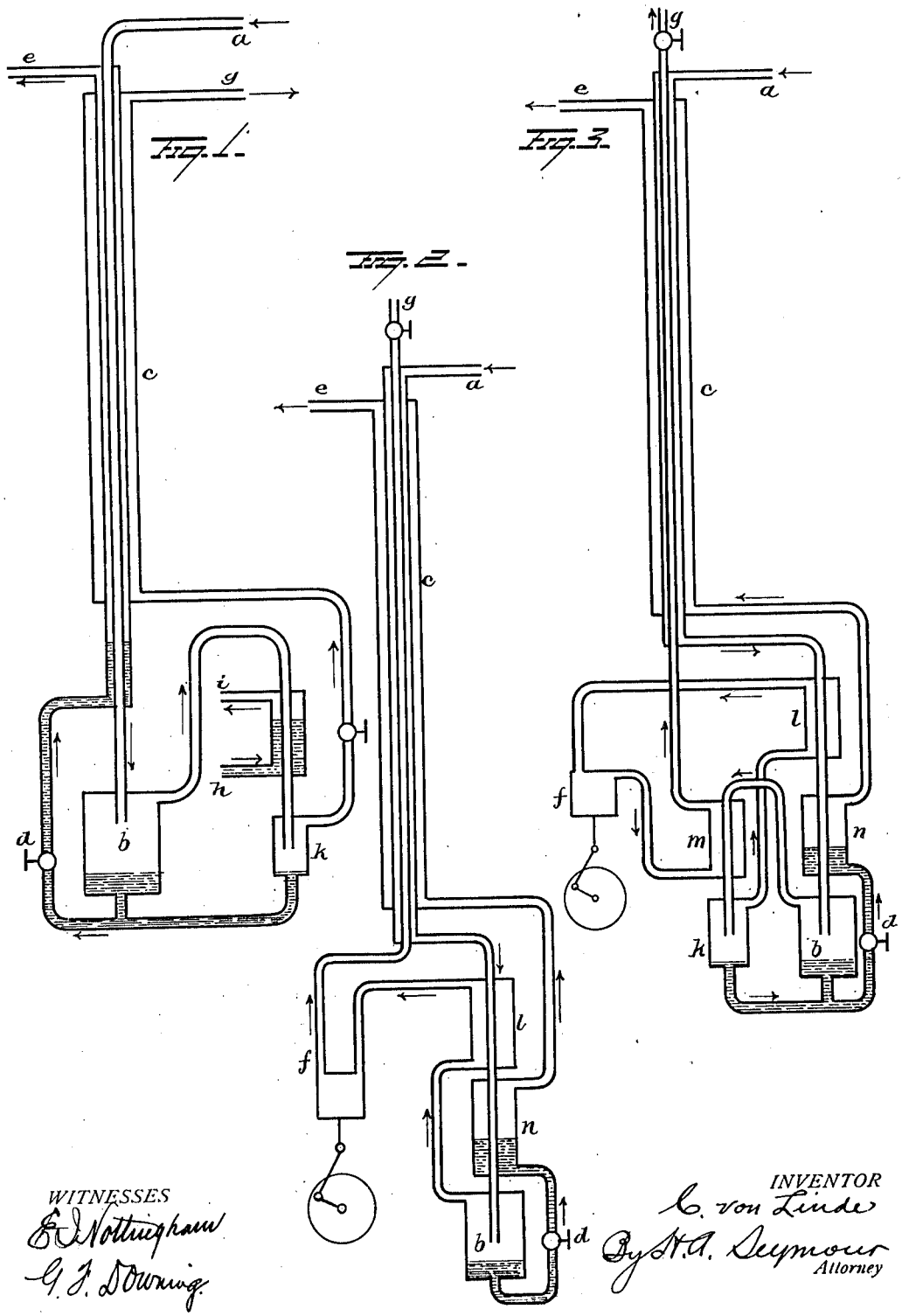

CARL VON LINDE, OF MUNICH, GERMANY.

PROCESS FOR SEPARATION OF HYDROGEN FROM GASEOUS MIXTURES.

1,020,103.   Specification of Letters Patent.   Patented Mar. 12, 1912.

Application filed October 23, 1911. Serial No. 656,092.

*To all whom it may concern:*

Be it known that I, CARL VON LINDE, of Munich, in the Kingdom of Bavaria, Germany, have invented certain new and useful Improvements in Processes for Separation of Hydrogen from Gaseous Mixtures; and I do hereby declare the following to be a full, clear, and exact description of the invention, such as will enable others skilled in the art to which it appertains to make and use the same.

This invention relates to an improvement in processes for the separation of hydrogen from gas mixtures containing hydrogen, and more particularly to improvements upon the process disclosed in my application for patent filed October 10, 1910, and designated by Serial No. 586,325.

When water-gas is resolved into one part rich in hydrogen and one part rich in carbon-monoxid, the former contains more carbon-monoxid and nitrogen than is desirable for many purposes, especially for use in airships, when the liquid air or nitrogen used for cooling evaporates at atmospheric pressure. The reason for this is that, at the normal boiling temperature of liquid nitrogen and to a still greater degree at the normal boiling temperature of liquid air, the partial pressures of the carbon-monoxid and nitrogen over the liquid separated out from the water-gas are still too high. If the liquid air or the liquid nitrogen employed for cooling is allowed to evaporate at less than atmospheric pressure, its temperature falls below the normal boiling point and at the same time a corresponding reduction takes place in the partial pressures of the gases mixed with the hydrogen, so that they are almost completely liquefied and only a very small residue remains as gas mixed with the hydrogen. In carrying out this process, it is preferable not to bring the entire quantity of liquid separated from the gas mixture to the lowest temperature, but first to liquefy the larger part of the constituents by means of the liquid (which in the case of water-gas consists principally of carbon-monoxid) which is separated out and then expanded to atmospheric pressure, and after that to bring the unliquefied part to the lowest temperature, which is accomplished with the aid of liquid air or liquid nitrogen boiling in a vacuum. The small quantity of liquid thus separated out is combined with the main quantity of the liquid previously separated, is reduced in pressure and employed for the separation of the mixture of gases. The unliquefied part, which now consists of very pure hydrogen, is separately expanded and conducted out through the counter current apparatus.

In the accompanying drawings, Figure 1 is a diagrammatical representation of one apparatus for carrying out my process, and Figs. 2 and 3 are similar views showing apparatus for accomplishing certain features of my invention.

An apparatus for carrying out this process is represented in Fig. 1. The compressed gas mixture is introduced at $a$, passes through the heat-interchanger $c$ from the top downward and is cooled by means of the liquefied portion of the gas mixture so that the major part of the constituents is separated in liquid form and collects in the receiver $b$. The unliquefied portion is still further cooled by liquid air or nitrogen, which enters at $h$ and is drawn off at $i$ under very low pressure, so that a further separation of the constituent impurities in the hydrogen takes place in the receptacle $k$. The liquid thrown down unites with the liquid coming from the receptacle $b$, both are reduced to atmospheric pressure by the expansion valve $d$, evaporate and become heated by exchange of heat with the incoming compressed gas mixture and finally escape through the pipe $e$. The unliquefied portion in the receptacle $k$ which consists of almost pure hydrogen flows out through the expansion valve $f$, passes through the heat inter-changer upward and is led off through the pipe $g$. A further modification of the process consists in not reducing the pressure of the non-liquefied hydrogen within the apparatus itself, but allowing it to pass through and issue from the heat interchanger at the same pressure at which the compressed gas mixture was introduced. This has the advantage that the receptacles serving for the exchange of heat can be made smaller than when the hydrogen flows through the heat exchanger at atmospheric pressure, for the amount of heat transmitted through the surfaces of the heat-interchanger is essentially dependent upon the pressure. Furthermore, in many cases the hydrogen obtained has to be used under pressure, as for example, when it is to be stored in steel tanks. When the hydrogen issues from the apparatus under pressure, a large part of the work of compression, which is necessary to force the hydrogen into the steel tanks, is avoided. To carry out this process it is only necessary to omit the expansion valve *f*.

If it is desired to allow the unliquefied part of the gas mixture, that is the hydrogen, instead of expanding through the valve *f* to expand and in expanding to perform external work and to apply the cooling effect thus produced in the apparatus, then certain requirements are to be observed. If the compressed gas mixture, freed from the major part of the constituents other than hydrogen at a temperature corresponding to the boiling point of carbon-monoxid, were allowed to expand and perform external work, so low a temperature would be reached that all the admixtures not previously liquefied would become solid and would obstruct the elements of the expansion mechanism. In order to avoid this objection, the gas mixture, freed from the major part of its constituents, is slightly heated by passing it in counter-current with the incoming, as yet not decomposed gas mixture and is then passed into the expanding mechanism. If in the operation of the process the hydrogen obtained is not desired of the highest purity, the expanded gas can be passed out direct through the heat interchanges. But if it is desired to obtain hydrogen of the greatest possible purity, the expansion is so performed that a correspondingly low temperature is obtained at which the constituent impurities in the hydrogen do not indeed become solid but have only a very slight vapor tension. This temperature is then transmitted to the hydrogen which still contains a few impurities and frees it from these impurities before it is conducted to the expansion apparatus.

To carry out this process the apparatus diagrammatically represented in Figs. 2 and 3 are used. In Fig. 2 the compressed gas mixture, for example water-gas, is introduced at *a* and is cooled in the two counter-current apparatus *c* and *l*. The condensible portions of the mixture are then liquefied by the liquid boiling in the receptacle *n*, are separated in the receptacle *b*, relieved of pressure at the expansion valve *d*, evaporated in the receptacle *n* and led off at *e* through counter-current apparatus *c*. The unliquefied part from the receptacle B is slightly warmed in the counter-current apparatus *l*, is then expanded in the expansion apparatus *f*, performing external work, and is finally led off at *g* through the counter-current apparatus.

The apparatus shown in Fig. 3 differs from that in Fig. 2 only in that the pure hydrogen which has expanded in the apparatus at *f*, and before it is led to the counter-current apparatus, flows through a second heat-interchanger *m*, in which it further cools the hydrogen already freed from the major part of its impurities, coming from the separating receptacle *b*. The thus liquefied remaining portion of the impurities are separated out in the receptacle *k* and unite with the major part of the liquefied constituents coming from the receptacle *b*.

Having fully described my invention what I claim as new and desire to secure by Letters-Patent, is,—

1. In the separation of practically pure hydrogen from a mixture of gases, the separation of a portion of the mixture by liquefaction in such a way that the incoming compressed gas mixture is brought into heat-interchanging relation with separated portions of the gas mixture previously expanded and is split up into a liquid portion composed principally of all other constituents and a gaseous portion composed principally of hydrogen and that the liquefied portion only is expanded, being led, together with the gaseous portion, in two separate streams in counter-current and heat-interchanging relation to the incoming compressed gas mixture, the gaseous portion leaving the apparatus at the same pressure as that at which the compressed mixture of gases is introduced.

2. In the separation of practically pure hydrogen from a mixture of gases, the separation of a portion of the mixture by liquefaction in such a way that the incoming compressed gas mixture is brought into heat-interchanging relation with separated portions of the gas mixture which have been previously expanded and subsequently cooled by liquid air or liquid nitrogen which is caused to evaporate at less than atmospheric pressure, whereby the compressed gas mixture is split up into a liquid portion composed principally of all the other constituents and a gaseous portion composed principally of hydrogen, and that then both these portions are individually expanded and after being cooled by liquid air or liquid nitrogen are led in two separate streams in counter-current and heat-interchanging relation to the incoming gas.

3. In the separation of practically pure hydrogen from a mixture of gases, the separation of a portion of the mixture by liquefaction in such a way that the incoming compressed gas mixture is brought into heat-interchanging relation with separated portions of the gas mixture of which the liquefied portion has been previously expanded while the gaseous portion is first cooled by liquid air or liquid nitrogen and is then expanded, whereby the compressed gas mixture is split up into a liquid portion composed principally of all the other constituents and a gaseous portion composed principally of hydrogen, and that then both these portions are individually expanded and are led in two separate streams in counter-current and heat-interchanging relation to the incoming gas.

4. In the separation of practically pure hydrogen from a mixture of gases, the separation of a portion of the mixture by liquefaction in such a way that the incoming compressed gas mixture is brought into heat-interchanging relation with separated portions of the gas mixture previously expanded, whereby the compressed gas mixture is split up into a liquid portion composed principally of all the other constituents and a gaseous portion composed principally of hydrogen, passing the gaseous portion prior to its expansion into heat inter-changing relation with such separated portion of such gaseous portion previously expanded, and flowing counter-current thereto, whereby practically all the remaining constituents except the hydrogen are liquefied before expansion by the reduction of their temperature thus produced, and that the separated gaseous portion before expansion is then raised in temperature by causing it to pass in counter-current and heat-interchanging relation to the compressed mixture of gases, and that then both the liquid and gaseous portions are individually expanded and are led in two separate streams in counter-current and heat-interchanging relation to the incoming compressed gas.

I testimony whereof, I have signed this specification in the presence of two subscribing witnesses.

CARL von LINDE.

Witnesses:
RICHARD LENYS,
MATHILDE K. HELD.